(12) United States Patent
Jun

(10) Patent No.: US 10,649,840 B2
(45) Date of Patent: May 12, 2020

(54) DATA STORAGE DEVICE PERFORMING RECOVERY OPERATION AFTER SUDDEN POWER-OFF AND OPERATING METHOD THEREOF

(71) Applicant: SK hynix Inc., Gyeonggi-do (KR)

(72) Inventor: Jang Hwan Jun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 195 days.

(21) Appl. No.: 15/829,227

(22) Filed: Dec. 1, 2017

(65) Prior Publication Data

US 2018/0336088 A1    Nov. 22, 2018

(30) Foreign Application Priority Data

May 19, 2017  (KR) .......................... 10-2017-0062029

(51) Int. Cl.
  *G06F 11/00*  (2006.01)
  *G06F 11/07*  (2006.01)
  *G06F 3/06*  (2006.01)

(52) U.S. Cl.
  CPC ........ *G06F 11/0793* (2013.01); *G06F 3/0604* (2013.01); *G06F 3/064* (2013.01); *G06F 3/0679* (2013.01); *G06F 11/0727* (2013.01); *G06F 11/0751* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,793,429 B1* | 7/2014 | Call | ..................... | G06F 12/0246 711/103 |
| 9,329,931 B2* | 5/2016 | Canepa | ............... | G06F 11/1008 |
| 9,558,080 B2* | 1/2017 | Bradshaw | ........... | G06F 11/1471 |
| 9,558,839 B2* | 1/2017 | Thompson | ............. | G11C 16/30 |
| 9,575,663 B2* | 2/2017 | Shim | ........................ | G11C 8/12 |
| 10,067,823 B2* | 9/2018 | Singhai | ............... | G06F 11/1048 |
| 2008/0270855 A1* | 10/2008 | Bae | ..................... | G06F 11/0751 714/722 |
| 2013/0138869 A1* | 5/2013 | Kwak | ................. | G06F 12/0246 711/103 |
| 2014/0143477 A1* | 5/2014 | Lin | ..................... | G06F 12/0246 711/103 |
| 2016/0306590 A1* | 10/2016 | Kang | ..................... | G06F 3/0652 |
| 2017/0062076 A1* | 3/2017 | Tsuji | ..................... | G11C 29/38 |

FOREIGN PATENT DOCUMENTS

KR    1020150082010    7/2015

* cited by examiner

*Primary Examiner* — Amine Riad
(74) *Attorney, Agent, or Firm* — IP & T Group LLP

(57) ABSTRACT

A data storage device includes a nonvolatile memory device including a plurality of memory blocks each of which includes a plurality of regions; and a controller suitable for controlling the nonvolatile memory device, the controller comprising: a block designation unit suitable for performing a level 2 designation operation, by storing start data in a level 2 management block among the memory blocks, storing a location of the level 2 management block in a level 1 management block among the memory blocks, and storing integrity check data in the level 2 management block; and a recovery unit suitable for performing a recovery operation to the level 1 management block depending on a state of a current level 2 management block corresponding to a last location stored in the level 1 management block in the case where a sudden power-off occurs.

17 Claims, 9 Drawing Sheets

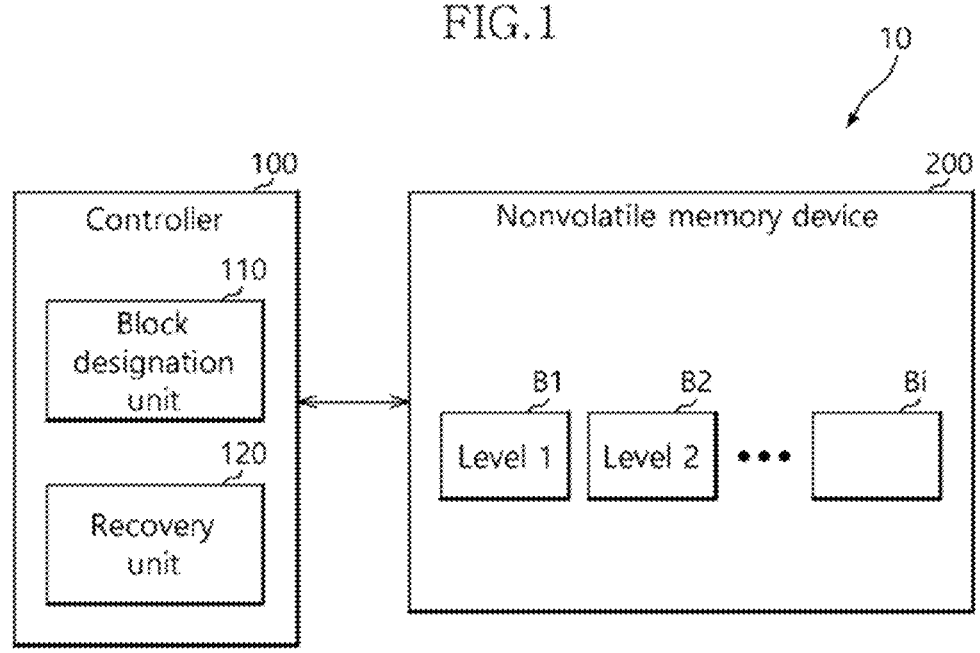
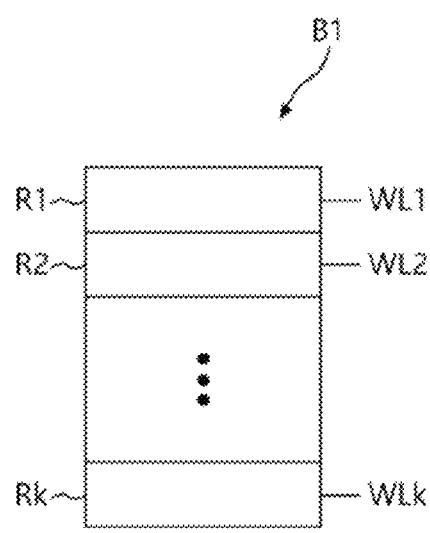

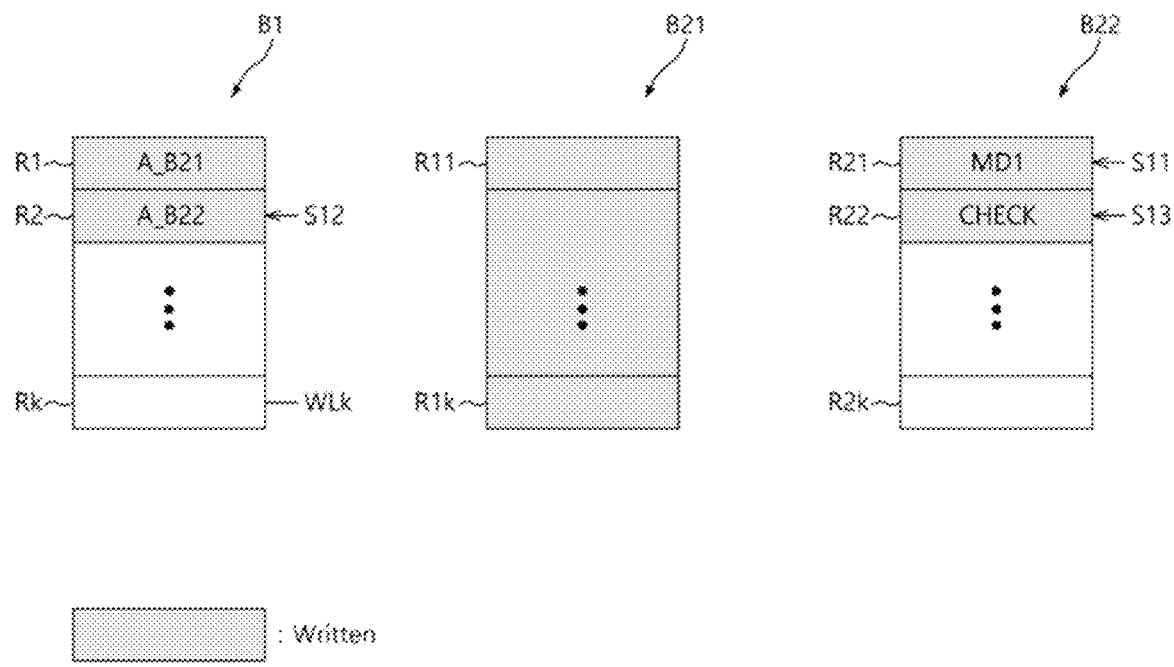

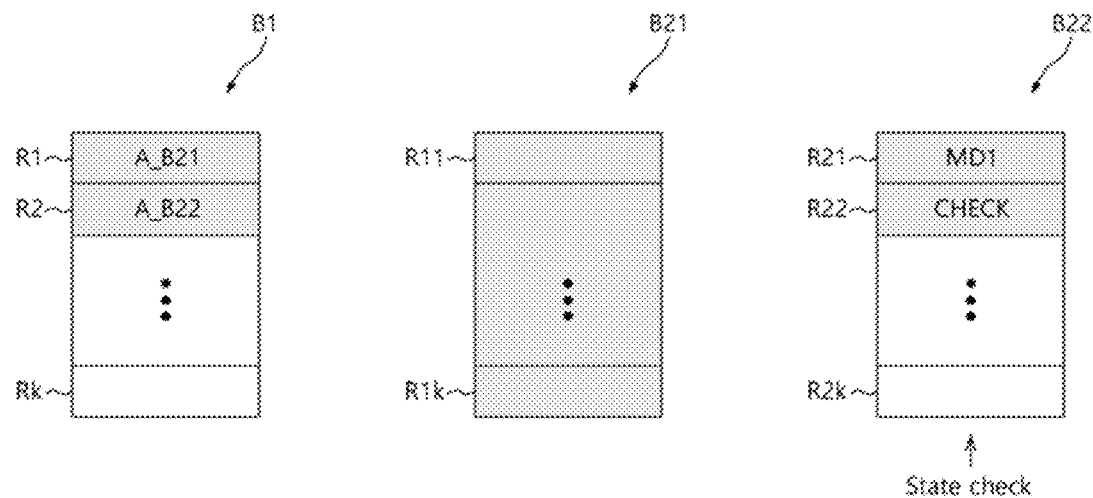
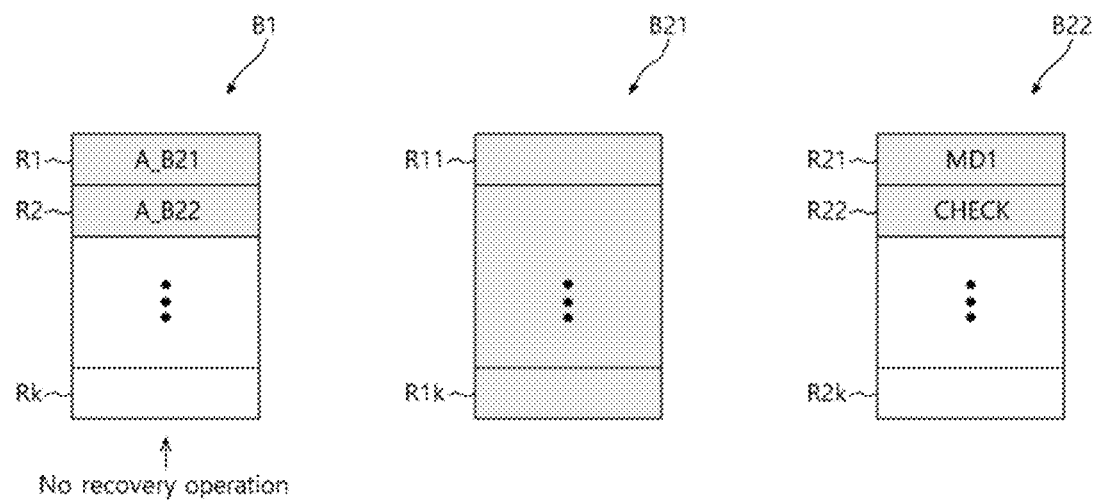

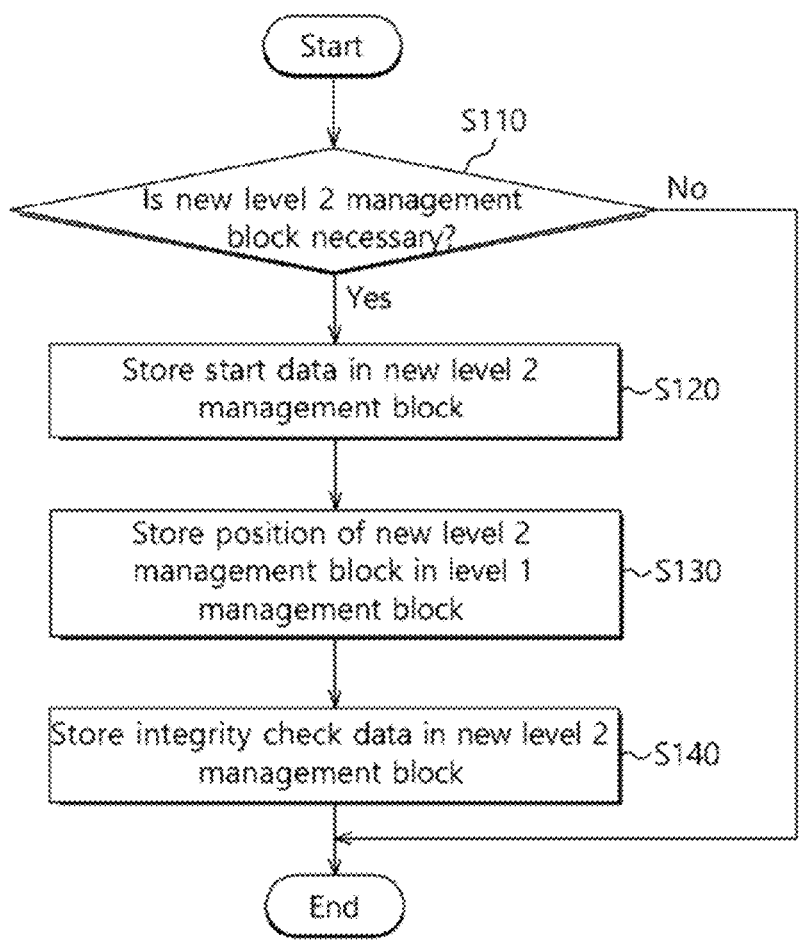

DATA STORAGE DEVICE PERFORMING RECOVERY OPERATION AFTER SUDDEN POWER-OFF AND OPERATING METHOD THEREOF

CROSS-REFERENCES TO RELATED APPLICATION

The present application claims priority to Korean application number 10-2017-0062029, filed on May 19, 2017, which is incorporated herein by reference in its entirety.

BACKGROUND

1. Technical Field

Various exemplary embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones, and the like. Data storage devices may be embedded in an external device during manufacturing of the external devices or may be fabricated separately and then connected afterwards to an external device.

SUMMARY

In an embodiment, a data storage device may include: a nonvolatile memory device including a plurality of memory blocks each of which includes a plurality of regions; and a controller suitable for controlling the nonvolatile memory device, the controller comprising: a block designation unit suitable for performing a level 2 designation operation, by storing start data in a level 2 management block among the memory blocks, storing a location of the level 2 management block in a level 1 management block among the memory blocks, and storing integrity check data in the level 2 management block; and a recovery unit suitable for performing a recovery operation to the level 1 management block depending on a state of a current level 2 management block corresponding to a last location stored in the level 1 management block in the case where a sudden power-off occurs.

In an embodiment, a method for operating a data storage device may include: performing a level 2 designation operation, by storing start data in a level 2 management block including a plurality of level 2 regions, storing a location of the level 2 management block in a level 1 management block including a plurality of level 1 regions, and storing integrity check data in the level 2 management block; and performing a recovery operation to the level 1 management block depending on a state of a current level 2 management block corresponding to a last location stored in the level 1 management block in the case where a sudden power-off occurs.

In an embodiment, a controller may include: a block designation unit suitable for designating a first memory block in a nonvolatile memory device for storing management data, and controlling the nonvolatile memory device to sequentially store first and second data in the first memory block and to store location information of the first memory block in a second memory block thereof; and a recovery unit suitable for controlling the nonvolatile memory device to perform a recovery operation to the second memory block according to a state of the first memory block after a sudden power-off.

In an embodiment, a method of controller may include: designating a first memory block in a nonvolatile memory device for storing management data; controlling the nonvolatile memory device to sequentially store first and second data in the first memory block and to store location information of the first memory block in a second memory block thereof; and controlling the nonvolatile memory device to perform a recovery operation to the second memory block according to a state of the first memory block after a sudden power-off.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIG. 1 is a block diagram illustrating an example of a data storage device in accordance with an embodiment of the present disclosure.

FIG. 2 is a diagram describing a structure of a memory block of a nonvolatile memory device.

FIG. 3 is a diagram describing a method for a block designation unit of FIG. 1 to perform a level 2 designation operation.

FIGS. 6A and 6B are diagrams describing a method for the recovery unit of FIG. 1 to perform a recovery operation depending on the state of a current level 2 management block.

FIG. 8 is a flow chart describing a method for the block designation unit of FIG. 1 to perform a level 2 designation operation.

DETAILED DESCRIPTION

Figure 4A:
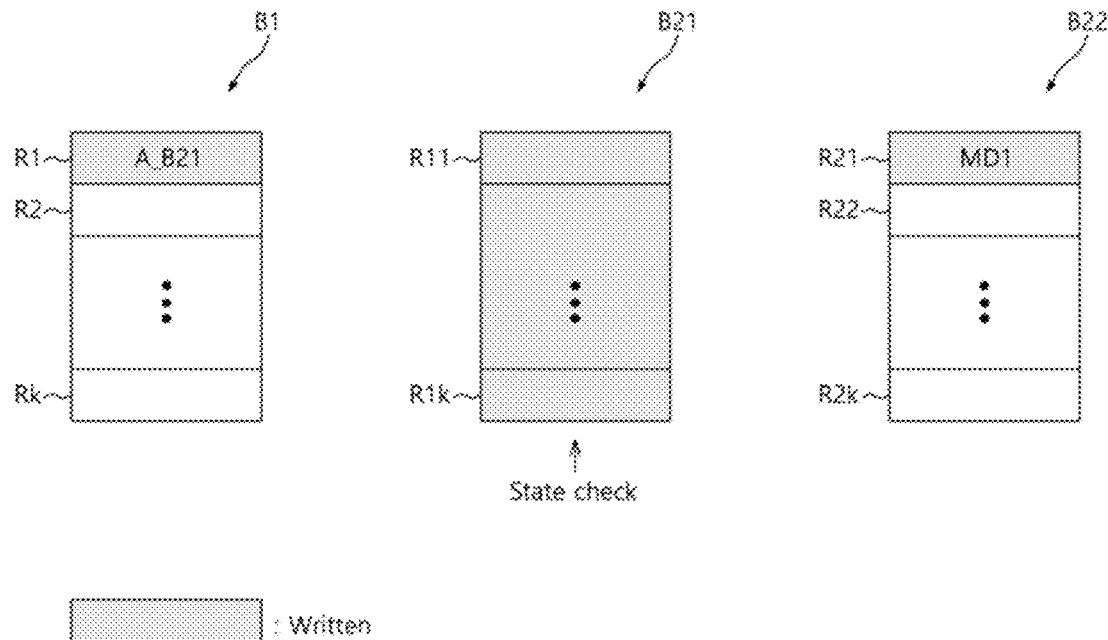
FIGS. 4A and 4B are diagrams describing a method for the recovery unit of FIG. 1 to perform a recovery operation depending on the state of a current level 2 management block.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various exemplary embodiments of the present disclosure will be described in detail with reference to the attached drawings.

FIG. 1 is a block diagram illustrating an example of a data storage device 10 in accordance with an embodiment of the present disclosure.

The data storage device 10 may store data provided from an external device, in response to a write request from the external device. Also, the data storage device 10 may be configured to provide stored data to the external device, in response to a read request from the external device.

The data storage device 10 may be configured by a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), and the like.

The data storage device 10 may include a controller 100 and a nonvolatile memory device 200.

The controller 100 may control general operations of the data storage device 10. The controller 100 may store data in the nonvolatile memory device 200 by controlling the nonvolatile memory device 200.

The controller 100 may control the operations of the data storage device 10 based on various management data. The management data may be newly generated or updated while the data storage device 10 operates. The controller 100 may store the management data in a memory block B2 of the nonvolatile memory device 200, which is designated as a level 2 management block. The controller 100 may read and use the management data in case of necessity such as booting. The controller 100 may store the location of the level 2 management block B2 in a memory block B1, which is designated as a level 1 management block. The controller 100 may refer to the location stored in the level 1 management block B1, when it is necessary to access the level 2 management block B2.

The controller 100 may include a block designation unit 110 and a recovery unit 120.

The block designation unit 110 may designate, as the level 2 management block, any one empty memory block B2, among memory blocks B1 to Bi included in the nonvolatile memory device 200. When a previously designated level 2 management block no longer has an empty region to store management data, the block designation unit 110 may designate a new level 2 management block B2.

The block designation unit 110 may perform a level 2 designation operation, designating the level 2 management block B2, according to predetermined processes. First, the block designation unit 110 may store start data in the new level 2 management block B2. The start data may be management data that is initially stored in the level 2 management block B2. After storing the start data, the block designation unit 110 may store the location of the level 2 management block B2 in the level 1 management block B1. After storing the location of the level 2 management block B2, the block designation unit 110 may store integrity check data in the level 2 management block B2. When the integrity check data has been stored in the level 2 management block B2, the level 2 designation operation is completed, and thereafter, the level 2 management block B2 may be used for storing management data.

When the level 1 management block B1 no longer has an empty region to store location data, the block designation unit 110 may designate, as a new level 1 management block, any one empty memory block, among the memory blocks B1 to Bi.

The recovery unit 120 may determine a current level 2 management block B2 based on the location data stored in the level 1 management block B1 and perform a recovery operation to the level 1 management block B1 and the level 2 management block B2, when a sudden power-off occurs. In detail, in a booting operation after a sudden power-off occurs, the recovery unit 120 may selectively perform the recovery operation to the level 1 management block B1 and the level 2 management block B2, depending on the state of the current level 2 management block B2. The state of the current level 2 management block B2 may represent the progress of the above-described level 2 designation operation. That is to say, which process the block designation unit 110 was performing in the above-described level 2 designation operation when the sudden power-off occurs may be estimated from the start data and the integrity check data stored in the current level 2 management block B2. Thus, unstable data may be detected therefrom, and the recovery operation may be selectively performed on the unstable data. As a result, according to the present embodiment, the recovery unit 120 may suppress the wear of a memory and quickly complete a booting operation, by skipping unnecessary recovery operation. A detailed operation method of the recovery unit 120 will be described later.

The nonvolatile memory device 200 may store data transmitted from the controller 100, read out stored data, and transmit read-out data to the controller 100, according to control of the controller 100.

The nonvolatile memory device 200 may include the plurality of memory blocks B1 to Bi. Memory block may be a unit by which the nonvolatile memory device 200 performs an erase operation. In other words, the nonvolatile memory device 200 may erase simultaneously data stored in a certain memory block, through an erase operation.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the data storage device 10 includes one nonvolatile memory device 200, it is to be noted that the present disclosure is not limited thereto and the data storage device 10 may include two or more nonvolatile memory devices according to various embodiments of the present disclosure. When the data storage device 10 includes two or more nonvolatile memory devices, a level 1 management block and a level 2 management block may be provided in different nonvolatile memory devices.

FIG. 2 is a diagram to assist in the explanation of the structure of the memory block B1 of the nonvolatile memory device 200. The memory blocks B2 to Bi shown in FIG. 1 may be configured in the same way as the memory block B1.

Referring to FIG. 2, the memory block B1 may include a plurality of regions R1 to Rk respectively corresponding to word lines WL1 to WLk. The regions R1 to Rk may be accessed when corresponding word lines are selected. Namely, in the regions R1 to Rk, write operations and read operations may be performed when corresponding word lines are selected. Each of the regions R1 to Rk may include a plurality of memory cells, which are coupled to a corresponding word line. Memory cells included in a single region may be simultaneously accessed as a corresponding word line is selected.

The regions R1 to Rk may be used to store data according to a predetermined write sequence. The write sequence may be, for example a sequence from the region R1 to the region Rk.

FIG. 3 is a diagram describing a method for the block designation unit 110 of FIG. 1 to perform the level 2 designation operation. FIG. 3 illustrates a level 1 management block B1, a previously designated level 2 management block B21, and a newly designated level 2 management block B22.

Referring to FIG. 3, when all of level 2 regions R11 to R1k included in the current level 2 management block B21 are used, that is, when the current level 2 management block B21 no longer has an empty level 2 region to store management data, the block designation unit 110 may designate the new level 2 management block B22.

When designating the new level 2 management block B22, the block designation unit 110 may store start data MD1 in a level 2 region R21 of the new level 2 management block B22 at step S11. The level 2 region R21 may precede (i.e. first in order) in a write sequence among level 2 regions R21 to R2k included in the new level 2 management block B22. The start data MD1 may be management data that is stored first in the level 2 management block B22. While the size of the start data MD1 is not limited, it is assumed in the following descriptions for the sake of convenience in explanation that the size of the start data MD1 corresponds to a single level 2 region.

At step S12, the block designation unit 110 may store a location A_B22 of the level 2 management block B22 in the level 1 region R2 among the level 1 regions R1 to Rk included in the level 1 management block B1. The location A_B22 of the level 2 management block B22 may be stored in the level 1 management block B1 following a location A_B21 of the current level 2 management block B21. While the size of location data such as the location A_B22 of the level 2 management block B22 is not limited, it is assumed in the following descriptions for the sake of convenience in explanation that the size of location data to be newly stored corresponds to a single level 1 region.

At step S13, the block designation unit 110 may store integrity check data CHECK in the level 2 region R22 of the level 2 management block B22. The level 2 region R22 in which the integrity check data CHECK is stored may follow the level 2 region R21 in which the start data MD1 is stored, according to the write sequence. The integrity check data CHECK may include, for example, dummy data. While the size of the integrity check data CHECK is not limited, it is assumed in the following descriptions for the sake of convenience in explanation that the size of the integrity check data CHECK corresponds to a single level 2 region. The block designation unit 110 may complete the level 2 designation operation by storing the integrity check data CHECK. The level 2 management block B22 may be used for storing management data, until it does not include an empty level 2 region to store management data.

Figure 4B:
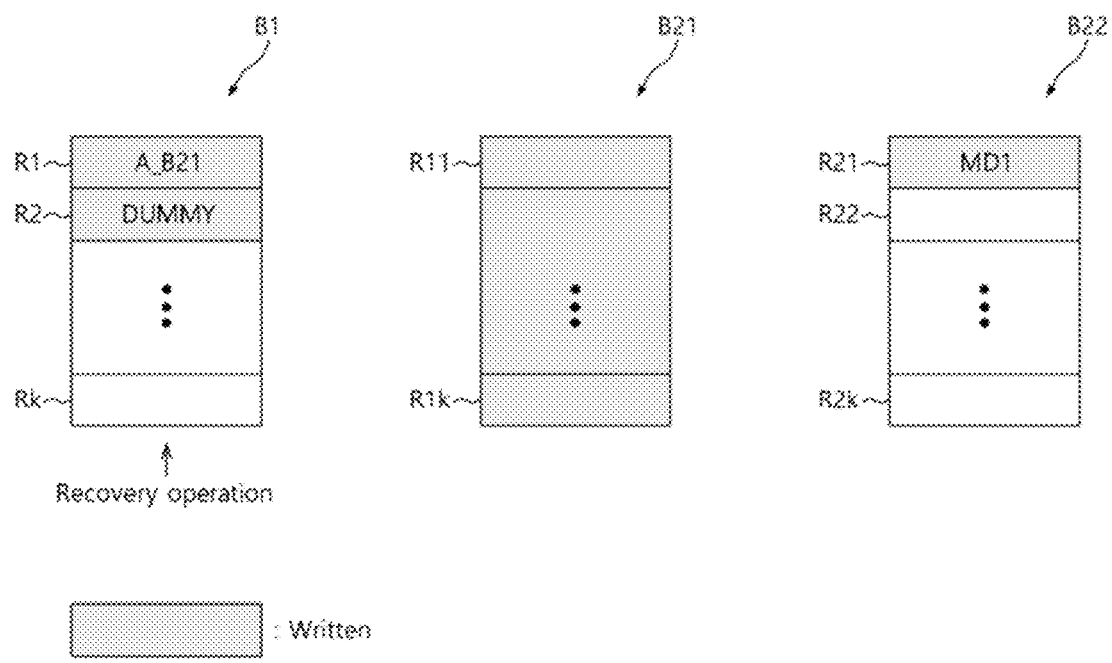

FIGS. 4A and 4B are diagrams describing a method for the recovery unit 120 of FIG. 1 to perform a recovery operation depending on the state of a current level 2 management block B21. FIGS. 4A and 4B describe the recovery operation when the current level 2 management block B21 no longer has an empty level 2 region to store management data.

Referring to FIG. 4A, first, the current level 2 management block B21 may be determined based on a location (hereinafter, referred to as a last location) A_B21 stored last in the level 1 management block B1. The recovery unit 120 may check the state of the current level 2 management block B21, and determine that the current level 2 management block B21 does not have an empty level 2 region to store management data. That is to say, even when a new level 2 management block B22 is designated at a time of sudden power off, the recovery unit 120 may check the state of the level 2 management block B21 based on the final location A_B21 of the level 1 management block B1.

FIG. 4A illustrates the case where the new level 2 management block B22 has been designated and start data MD1 is being stored in the level 2 region R21 of the new level 2 management block B22 at a time of a sudden power off.

Also, FIG. 4A illustrates the case where start data MD1 is stored in the level 2 region R21, but the location of the new level 2 management block B22 is not yet stored in the level 1 management block B1 at a time of a sudden power off.

Moreover, FIG. 4A illustrates the case where start data MD1 is stored in the level 2 region R21 and the location of the new level 2 management block B22 is being stored in the level 1 region R2 of the level 1 management block B1 at a time of a sudden power off. In this case, the location A_B21 of the current level 2 management block B21 may be determined as a last location and the location of the new level 2 management block B22 may be unstable data in the level 1 region R2 of the level 1 management block B1. Therefore, appropriate measures should be taken such that the level 1 region R2 is not used again.

Therefore, referring to FIG. 4B the recovery unit 120 may perform the recovery operation by performing a dummy write operation to the level 1 region R2 following, according to the write sequence, the level 1 region R1 in which the last location A_B21 is stored, in the level 1 management block B1. In other words, the recovery unit 120 may process the level 1 region R2 such that the level 1 region R2 is no longer used, by storing dummy data DUMMY in the level 1 region R2 which may be in an unstable state. Meanwhile, the block designation unit 110 may perform the level 2 designation operation by designating a new level 2 management block instead of the level 2 management block B22.

Figure 5A:
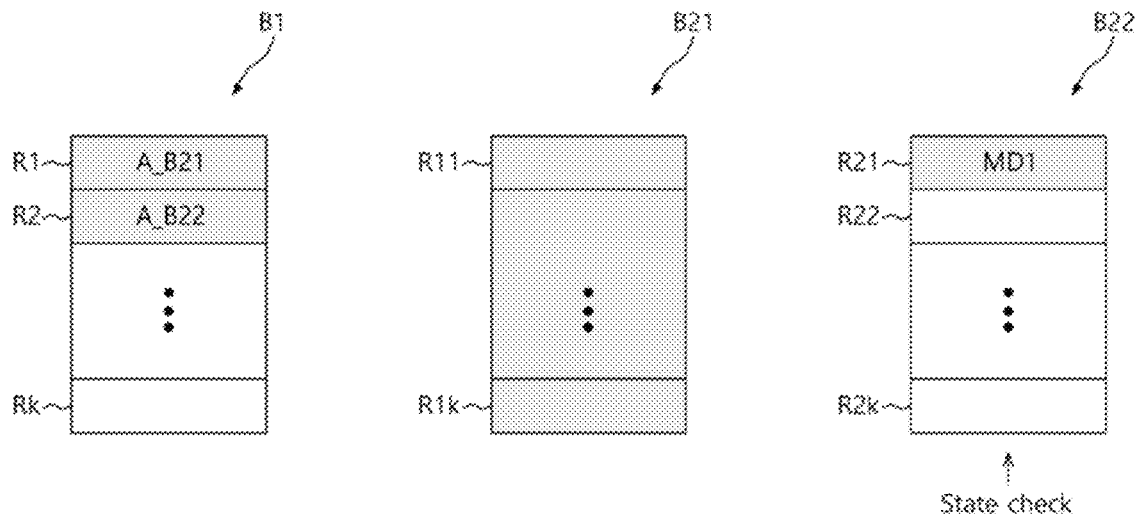
FIGS. 5A and 5B are diagrams describing a method for the recovery unit of FIG. 1 to perform a recovery operation depending on the state of a current level 2 management block.
Figure 5B:
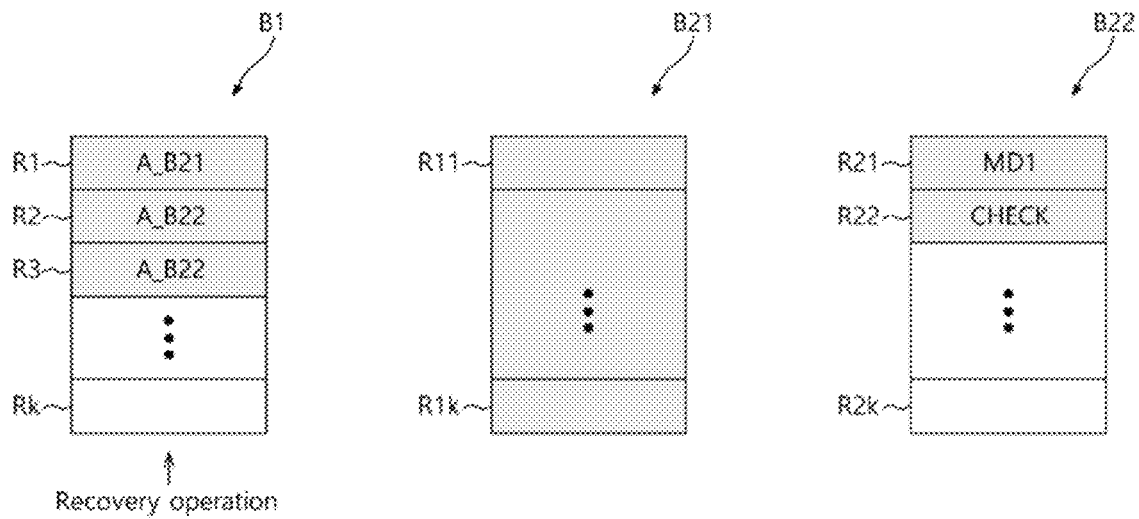

FIGS. 5A and 5B are diagrams describing a method for the recovery unit 120 of FIG. 1 to perform a recovery operation depending on the state of a current level 2 management block B22. FIGS. 5A and 5B describe the recovery operation when the current level 2 management block B22 retains only start data MD1.

Referring to FIG. 5A, as described above, the recovery unit 120 may detect the current level 2 management block B22 based on a last location A_B22, which is stored in the level 1 management block B1. The recovery unit 120 may check the state of the current level 2 management block B22, and determine that the level 2 management block B22 retains only the start data MD1. Whether the level 2 management block B22 retains only the start data MD1 may be determined by identifying the data read from the level 2 management block B22.

FIG. 5A illustrates the case where the start data MD1 is stored in the new level 2 management block B22, the location A_B22 of the level 2 management block B22 is stored in the level 1 region R2 of the level 1 management block B1, and integrity check data is not stored in the level 2 region R22 following the start data MD1 at a time of a sudden power off.

Also, FIG. 5A illustrates the case where the location A_B22 of the new level 2 management block B22 is being stored in the level 1 region R2 of the level 1 management block B1 at a time of a sudden power off. In this case, even though the location A_B22 is sufficiently stored to be identified as the last location, the last location A_B22 stored in the level 1 region R2 may be in an unstable state since the location A_B22 is being stored at a time of a sudden power off.

Therefore, referring to FIG. 5B, the recovery unit 120 may perform the recovery operation by performing a copy operation of the last location A_B22 for the level 1 region R3 following, according to the write sequence, the level 1 region R2 in which the last location A_B22 is stored, in the level 1 management block B1. Namely, the recovery unit 120 may stably store again the last location A_B22 in the level 1 region R3.

Meanwhile, the block designation unit 110 may store integrity check data CHECK, which is not stored in the level 2 management block B22 due to the sudden power-off, in the level 2 region R22 following the start data MD1. While there is a possibility that the level 2 region R22 is also unstable due to the sudden power-off, such a situation does not raise an issue as the integrity check data CHECK is configured by dummy data.

FIGS. 6A and 6B are diagrams describing a method for the recovery unit 120 of FIG. 1 to perform a recovery operation depending on the state of a current level 2 management block B22. FIGS. 6A and 6B describe the recovery operation when the current level 2 management block B22 retains only start data MD1 and integrity check data CHECK.

Referring to FIG. 6A, as described above, the recovery unit 120 may determine the current level 2 management block B22 based on a last location A_B22 which is stored in the level 1 management block B1. The recovery unit 120 may check the state of the current level 2 management block B22, and determine that the level 2 management block B22 retains only the start data MD1 and the integrity check data CHECK. Whether the level 2 management block B22 retains only the start data MD1 and the integrity check data CHECK may be determined by identifying the data read from the level 2 management block B22.

FIG. 6A illustrates the case where the start data MD1 is stored in the new level 2 management block B22, the location A_A22 of the level 2 management block B22 is stored in the level 1 region R2 of the level 1 management block B1, and the integrity check data CHECK is stored in the level 2 management block B22 at a time of a sudden power off. That is, the level 2 designation operation to the level 2 management block B22 is completed at a time of a sudden power off, and in this case, unstable data may not exist in the level 1 management block B1 and the level 2 management block B22.

Hence, referring to FIG. 6B, the recovery unit 120 may skip the recovery operation to the level 1 management block B1.

Figure 7A:
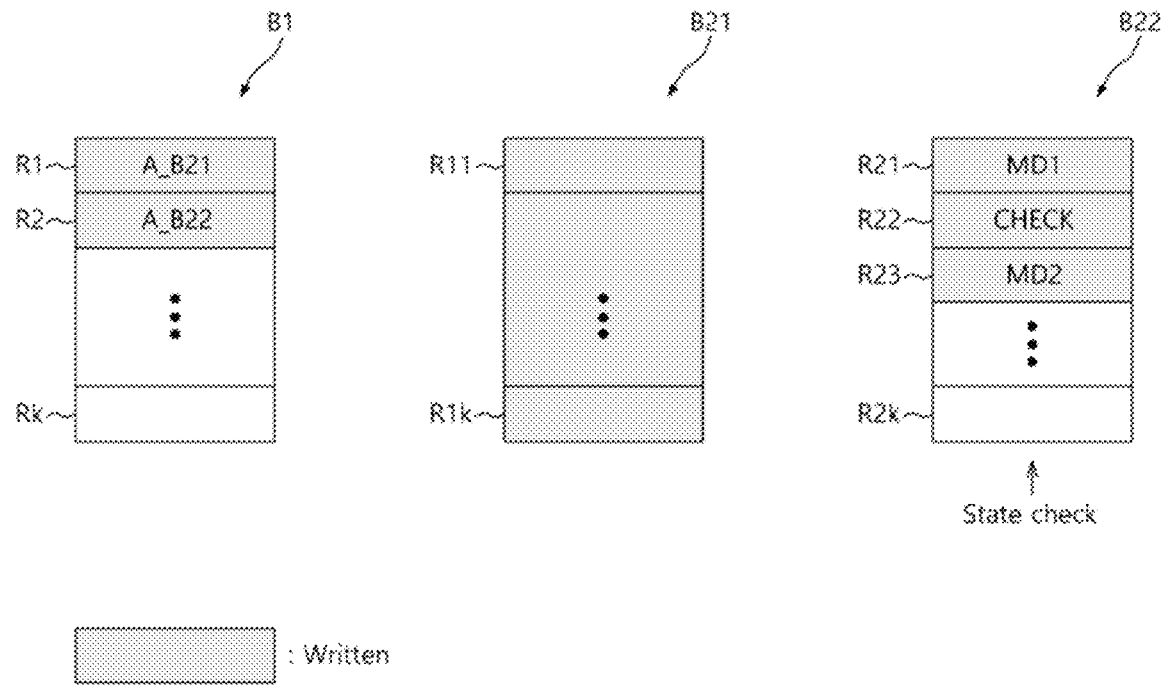
FIGS. 7A and 7B are diagrams describing a method for a recovery unit of FIG. 1 to perform a recovery operation depending on the state of a current level 2 management block.
Figure 7B:
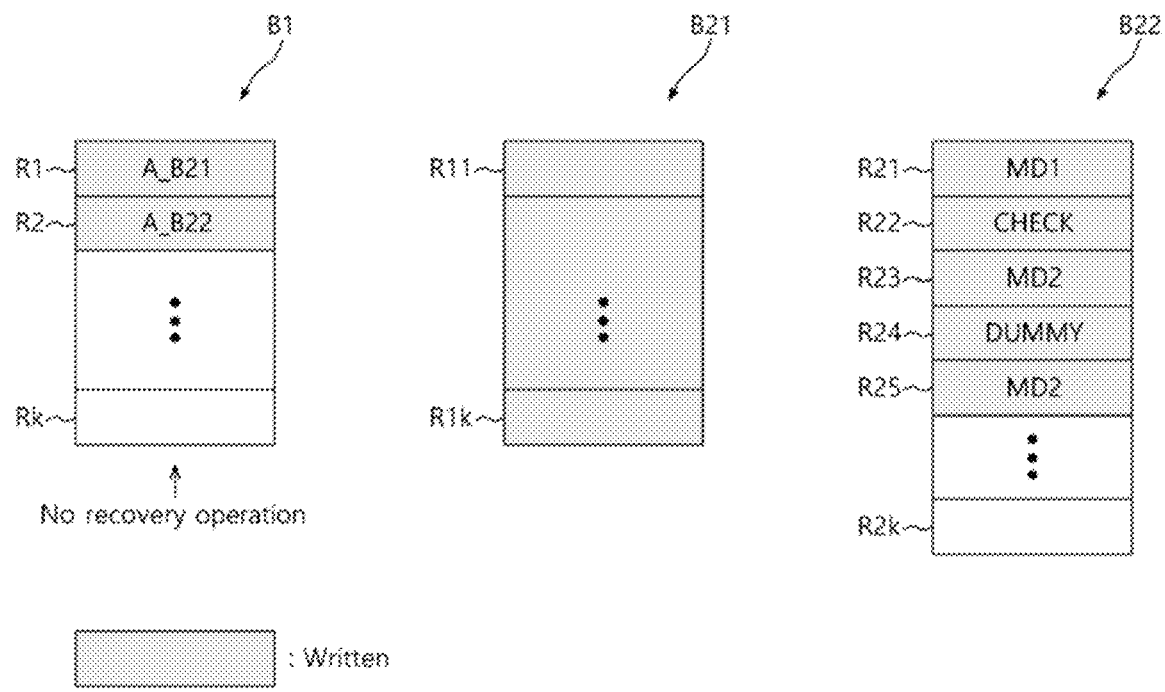

FIGS. 7A and 7B are diagrams describing a method for the recovery unit 120 of FIG. 1 to perform a recovery operation depending on the state of a current level 2 management block B22. FIGS. 7A and 7B describe the recovery operation when the current level 2 management block B22 retains start data MD1 and integrity check data CHECK and has at least one empty level 2 region to store management data.

Referring to FIG. 7A, as described above, the recovery unit 120 may determine the current level 2 management block B22 based on a last location A_B22, which is stored in the level 1 management block B1. The recovery unit 120 may check the state of the current level 2 management block B22, and determine that the level 2 management block B22 not only includes the start data MD1 and the integrity check data CHECK, but also includes management data MD2 that is stored subsequently. Further, the recovery unit 120 may determine that the level 2 management block B22 has at least one empty level 2 region to store management data.

FIG. 7A illustrates the case where the level 2 designation operation to the level 2 management block B22 is completed at a time of a sudden power off. In this case, unstable data may not exist in the level 1 management block B1 and the level 2 management block B22.

Hence, referring to FIG. 7B, the recovery unit 120 may skip the recovery operation to the level 1 management block B1.

According to an embodiment, the recovery unit 120 may perform the recovery operation to the level 2 management block B22 when management data MD2 is being stored in the level 2 region R23 of the level 2 management block B22 at a time of a sudden power off. In this case, the level 2 region R23 and the following level 2 region R24 may become unstable and thus the recovery unit 120 may prevent the level 2 region R24 from being used, by performing a dummy write operation to the level 2 region R24 following according to the write sequence, the level 2 region R23 in which the last management data MD2 is being stored, in the level 2 management block B22. In addition, the recovery unit 120 may stably store again the management data MD2 that may be unstable, by performing a copy operation of the management data MD2 for the level 2 region R25 following, according to the write sequence, the level 2 region R24, in the level 2 management block B22.

FIG. 8 is a flow chart describing a method for the block designation unit 110 of FIG. 1 to perform a level 2 designation operation.

Referring to FIG. 8, at step S110, the block designation unit 110 may determine whether a new level 2 management block is needed. That is, when a current level 2 management block no longer has an empty level 2 region to store management data, the block designation unit 110 may determine that a new level 2 management block is needed. When a new level 2 management block is not needed, the process may be ended. When a new level 2 management block is needed, the process may proceed to step S120.

At the step S120, when the block designation unit 110 determines that a new level 2 management block is needed, the block designation unit 110 may designate a new level 2 management block B2, and store start data MD1 in the new level 2 management block B2. The start data MD1 may be management data that is stored first in the level 2 management block B2.

At step S130, the block designation unit 110 may store the location of the new level 2 management block B2 in the level 1 management block B1. The location of the new level 2 management block B2 may be stored in the level 1 management block B1 following the location of the current level 2 management block.

At step S140, the block designation unit 110 may store integrity check data in the new level 2 management block B2. By storing the integrity check data, the block designation unit 110 may complete the level 2 designation operation.

Figure 9:
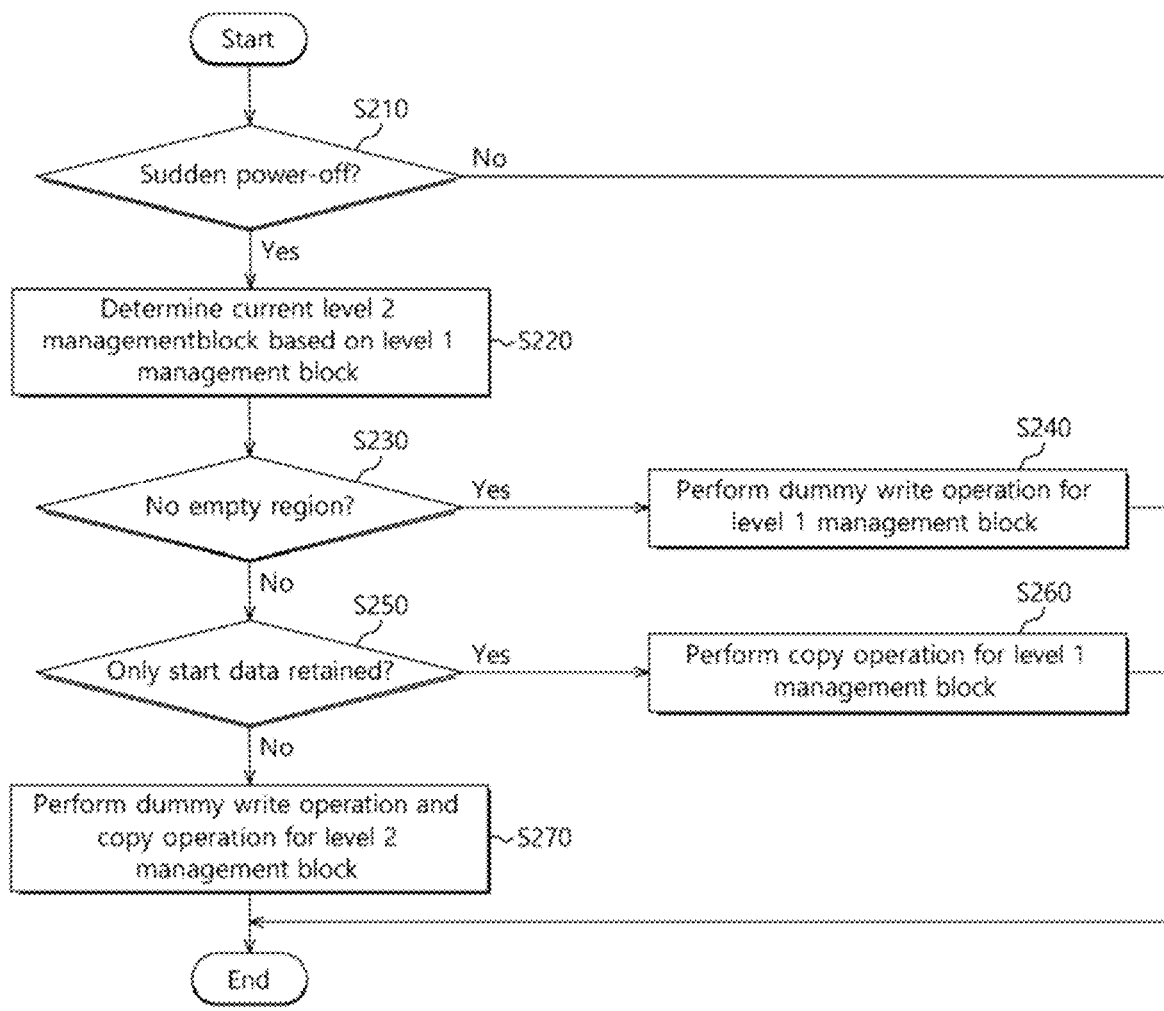
FIG. 9 is a flow describing a method for the recovery unit of FIG. 1 to perform a recovery operation.

FIG. 9 is a flow chart describing a method for the recovery unit 120 of FIG. 1 to perform a recovery operation.

Referring to FIG. 9, at step S210, the recovery unit 120 may determine whether a sudden power-off has occurred before a power-on. In the case where a sudden power-off has not occurred, the process may be ended. In the case where a sudden power-off has occurred, the process may proceed to step S220.

At the step S220, if the recovery unit 12 determines that a sudden power-off has occurred, the recovery unit 120 may determine a current level 2 management block B2 based on a last location which is stored in the level 1 management block B1.

At step S230, the recovery unit 120 may determine whether the current level 2 management block B2 does not have an empty level 2 region to store management data. When the current level 2 management block B2 has an empty level 2 region to store management data ("No" at step S230), the process may proceed to step S250. When the current level 2 management block B2 does not have an empty level 2 region to store management data ("Yes" at step S230), the process may proceed to step S240.

At the step S240, the recovery unit 120 may perform a dummy write operation to the level 1 management block B1. In detail, the recovery unit 120 may perform the dummy write operation to a level 1 region following, according to a write sequence, a level 1 region in which the last location is stored, in the level 1 management block B1. Thereafter, the recovery operation may be ended.

At the step S250, the recovery unit 120 may determine whether the current level 2 management block B2 retains only start data. When the current level 2 management block B2 does not retain only start data, that is, when the current level 2 management block B2 retains start data and integrity check data, the process may proceed to S270. When the current level 2 management block B2 retains only start data, the process may proceed to step S260.

At the step S260, the recovery unit 120 may perform a copy operation to the level 1 management block B1. In detail, the recovery unit 120 may perform the copy operation of the last location for a level 1 region following, according to the write sequence, the level 1 region in which the last location is stored, in the level 1 management block B1. Thereafter, the recovery operation may be ended.

At the step S270, the recovery unit 120 may perform a dummy write operation and a copy operation to the level 2 management block B2. In detail, the recovery unit 120 may perform the dummy write operation to a level 2 region following a level 2 region in which last management data is stored, in the level 2 management block B2. Then, the recovery unit 20 may perform the copy operation of a last location for a level 2 region following the level region for which the dummy write operation is performed. Meanwhile, the recovery unit 120 may skip a recovery operation to the level 1 management block B1. In other words, since a level 2 designation operation is completed at a time of a sudden power off, the recovery unit 120 may skip the recovery operation to the level 1 management block B1. Thereafter, the recovery operation may be ended.

Figure 10:
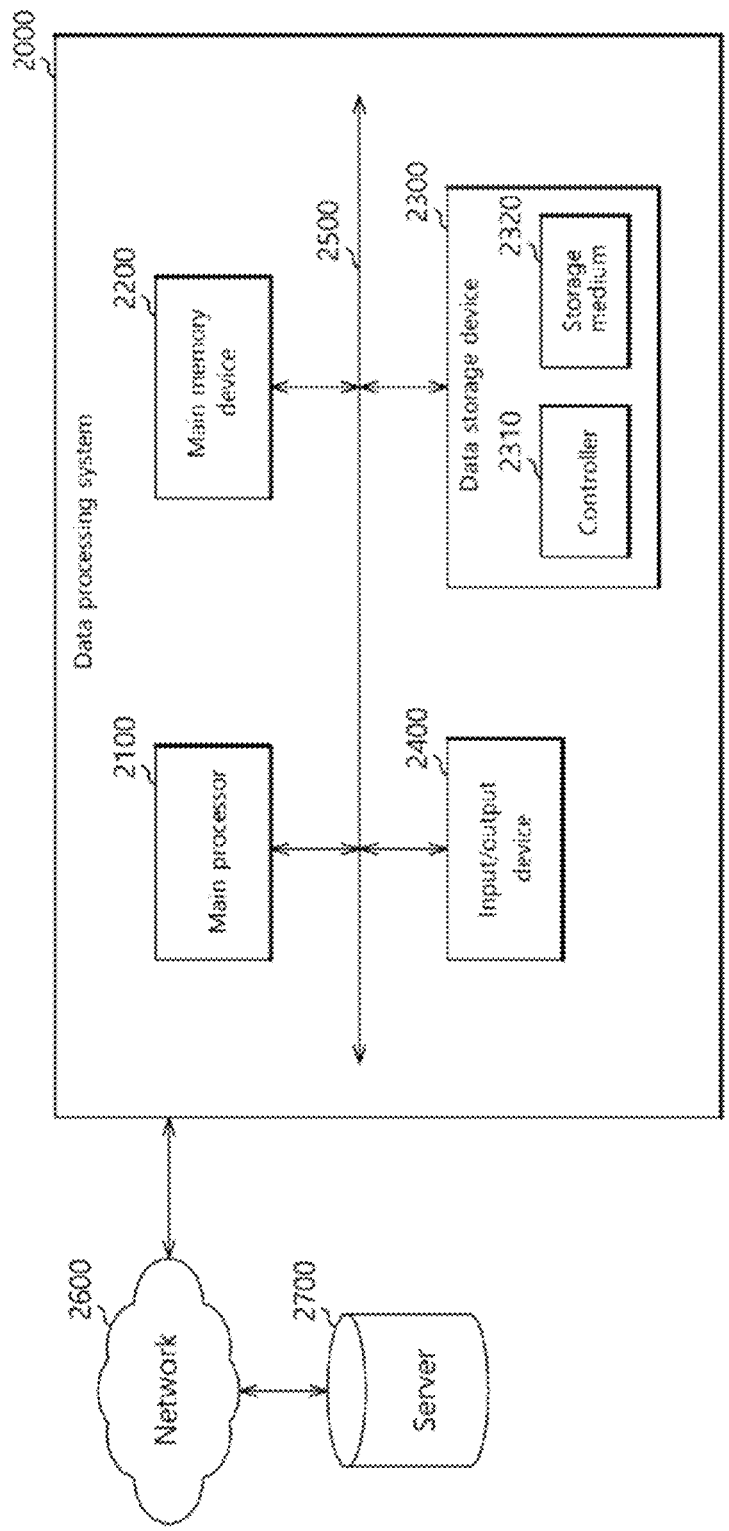
FIG. 10 is a block diagram illustrating an example of a data processing system to which the data storage device in accordance with an embodiment of the present disclosure is applied.

FIG. 10 is a block diagram illustrating an example of a data processing system 2000 to which the data storage device 10 in accordance with the embodiment is applied.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, such as a microprocessor. The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

While various exemplary embodiments of the present disclosure have been described above, it will be understood to those skilled in the art that those exemplary embodiments described are mere examples. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
a nonvolatile memory device including a plurality of memory blocks each of which includes a plurality of regions; and
a control circuit configured to control the nonvolatile memory device,
the control circuit comprising:
a block designation circuit configured to perform a level 2 designation operation, by storing start data in a 2 management block among the memory blocks, storing a location of the level 2 management block in a level 1 management block among the memory blocks, and storing integrity check data in the level 2 management block; and
a recovery circuit configured to perform a recovery operation to the level 1 management block depending on a state of a current level 2 management block corresponding to a last location stored in the level 1 management block in the case where a sudden power-off occurs.

2. The data storage device according to claim 1,
wherein the recovery circuit performs a dummy write operation to a first level 1 region among level 1 regions included in the level 1 management block when the current level 2 management block does not include an empty level 2 region, and
wherein the first level 1 region follows, according to a write sequence, a second level 1 region in which the last location is stored, among the level 1 regions.

3. The data storage device according to claim 2, wherein the block designation circuit designates a new level 2 management block by performing the level 2 designation operation after the dummy write operation is performed.

4. The data storage device according to claim 1,
wherein the recovery circuit performs a copy operation of the last location for a first level 1 region among level 1 regions included in the level 1 management block when the current level 2 management block retains only start data, and
wherein the first level 1 region follows, according to a write sequence, a second level 1 region in which the last location is stored, among the level 1 regions.

5. The data storage device according to claim 4, wherein the block designation circuit stores the integrity check data in the current level 2 management block after the copy operation is performed.

6. The data storage device according to claim 1, wherein the recovery circuit skips the recovery operation when the current level 2 management block retains the start data and the integrity check data and has at least one empty level 2 region.

7. The data storage device according to claim 6,
wherein the recovery circuit performs a dummy write operation to a first level 2 region among current level 2 regions included in the current level 2 management block, and performs a copy operation of last management data stored in the level 2 management block, for a second level 2 region among the current level 2 regions,
wherein the first level 2 region follows, according to a write sequence, a third level 2 region in which the last management data is stored, and
wherein the second level 2 region follows, according to the write sequence, the first level 2 region.

8. The data storage device according to claim 1, wherein the block designation circuit designates the level 2 management block by performing the level 2 designation operation when a current level 2 management block does not have an empty level 2 region.

9. A method for operating a data storage device, comprising:
performing a level 2 designation operation, by storing start data in a level 2 management block including a plurality of level 2 regions, storing a location of the level 2 management block in a level 1 management block including a plurality of level 1 regions, and storing integrity check data in the level 2 management block; and
performing a recovery operation to the level 1 management block depending on a state of a current level 2 management block corresponding to a last location stored in the level 1 management block in the case where a sudden power-off occurs.

10. The method according to claim 9,
wherein the performing of the recovery operation comprises:
performing a dummy write operation to a first level 1 region among the level 1 regions when the current level 2 management block does not have an empty level 2 region, and
wherein the first level 1 region follows, according to a write sequence, a second level 1 region in which the last location is stored, among the level 1 regions.

11. The method according to claim 10, further comprising:
designating a new level 2 management block by performing the level 2 designation operation after performing the dummy write operation.

12. The method according to claim 9,
wherein the performing of the recovery operation comprises:
performing a copy operation of the last location for a first level 1 region among the level 1 regions when the current level 2 management block retains only start data, and
wherein the first level 1 region follows, according to a write sequence, a second level 1 region in which the last location is stored, among the level 1 regions.

13. The method according to claim 12, further comprising:
    storing the integrity check data in the current level 2 management block after performing the copy operation.

14. The method according to claim 9, wherein the performing of the recovery operation comprises:
    skipping the recovery operation when the current level 2 management block retains the start data and the integrity check data and has at least one empty level 2 region.

15. The method according to claim 14,
    wherein the performing of the recovery operation comprises:
    performing a dummy write operation to a first level 2 region among current level 2 regions included in the current level 2 management block; and
    performing a copy operation of last management data stored in the level 2 management block, for a second level 2 region among the current level 2 regions,
    wherein the first level 2 region follows, according to a write sequence, a third level 2 region in which the last management data is stored, and
    wherein the second level 2 region follows, according to the write sequence, the first level 2 region.

16. The method according to claim 9, wherein the performing of the level 2 designation operation comprises:
    designating the level 2 management block when a current level 2 management block does not have an empty level 2 region.

17. A controller comprising:
    a block designation circuit configured to designate a first memory block in a nonvolatile memory device for storing management data, and controlling the nonvolatile memory device to sequentially store first and second data in the first memory block and to store location information of the first memory block in a second memory block thereof; and
    a recovery circuit configured to control the nonvolatile memory device to perform a recovery operation to the second memory block according to a state of the first memory block after a sudden power-off.

* * * * *